Nov. 3, 1959    H. C. LEE ET AL    2,911,144
RECORDERS

Filed Dec. 6, 1955    2 Sheets-Sheet 1

FIG. I

INVENTORS.
HERBERT C. LEE
WILLIAM F. ALLENBY
BY
ATTORNEY

Nov. 3, 1959 H. C. LEE ET AL 2,911,144
RECORDERS

Filed Dec. 6, 1955 2 Sheets-Sheet 2

INVENTORS.
HERBERT C. LEE
WILLIAM F. ALLENBY
BY
ATTORNEY

United States Patent Office 2,911,144
Patented Nov. 3, 1959

2,911,144

RECORDERS

Herbert C. Lee, Boston, Mass., and William F. Allenby, Stratford, Conn.; said Allenby assignor to said Lee Application December 6, 1955, Serial No. 551,281

13 Claims. (Cl. 235—61)

The present invention relates to apparatus for measuring and recording time as a function of one or more variables. In this art it is often necessary to relate time and cost in varying manners to produce an accumulated cost based on different variables. To mention one, it is often desirable to record and print the total cost of a long-distance telephone conversation involving variables such as base rate, initial time for base rate and overtime charge per minute. Another instance in which such apparatus finds application relates to the automatic time study and recording of machining operations on a piece of work, the assembly of work pieces to make a sub-combination, and the assembly of sub-combinations to make a completed article.

The principal object of the invention is to provide apparatus capable of measuring, recording and printing consumed time in relation to one or more variables.

Other objects include the provision of a time-recorder related to cost at a predetermined unit rate; the provision of such a recorder in which cost of a function is accurately accumulated even though one or more variables are present; the provision of such an apparatus in which a predetermined base rate for a predetermined time can be integrated with a predetermined different rate for a different time interval; the provision of such an apparatus in which a predetermined rate for a unit of time is adapted to be accumulated only at a predetermined point within successive units of time; and the provision of such an apparatus wherein the accumulated cost can be permanently printed for future reference.

The above, as well as other objects and novel features of the invention will become apparent from the following specification and accompanying drawings, in which:

Figure 1 is a schematic view of apparatus to which the principles of the invention have been applied;

Although the principles of the invention are applicable to many different types of apparatus wherein time in relation to one or more variables is to be measured, recorded and printed, they will be shown as applied to an apparatus for use in the art of telephony.

Figure 5:
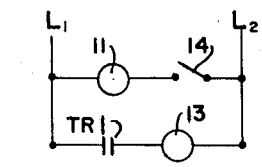
Fig. 5 is a wiring diagram for the apparatus of Fig. 1.

Referring to the drawings, and particularly to Fig. 1, the numeral 10 represents the scale of an adjustable timing device 11 which in the present embodiment of the invention serves to introduce into the system the base time within which a telephone call is to be made for a predetermined charge. This timing device 11 may be of the spring-actuated escapement type as shown in Patent 1,128,557 to Del Valle, dated February 16, 1915, or it may be in the form of a time-delay relay 11 as schematically represented in the wiring diagram of Fig. 5. Suffice it to say that by movement of the pointer 12, a predetermined base time can be set. At the end of said base time, a switch such as the normally-open $TR_1$ switch forming a contact of the time-delay relay 11 of Fig. 5 is closed to energize a synchronous clock motor 13. Preferably, the pointer 12 remains in its pre-set condition until released by a start-stop switch 14 that may energize the relay 11, which after a preset time energizes the synchronous clock motor 13. A face 15 is provided for the motor 13 indicating minutes and seconds of elapsed time. A minute hand 16 as well as a second hand 17 are also provided which are driven in the usual manner by the synchronous clock motor 13. The clock is of the stop-watch variety that can readily be re-set to zero. The second hand, of course, makes one revolution per minute, and the shaft that drives the second hand also drives a shaft 18 that is geared in a ratio of 1:1 through bevel gears 19 and 20 to a shaft 21.

Figure 2:
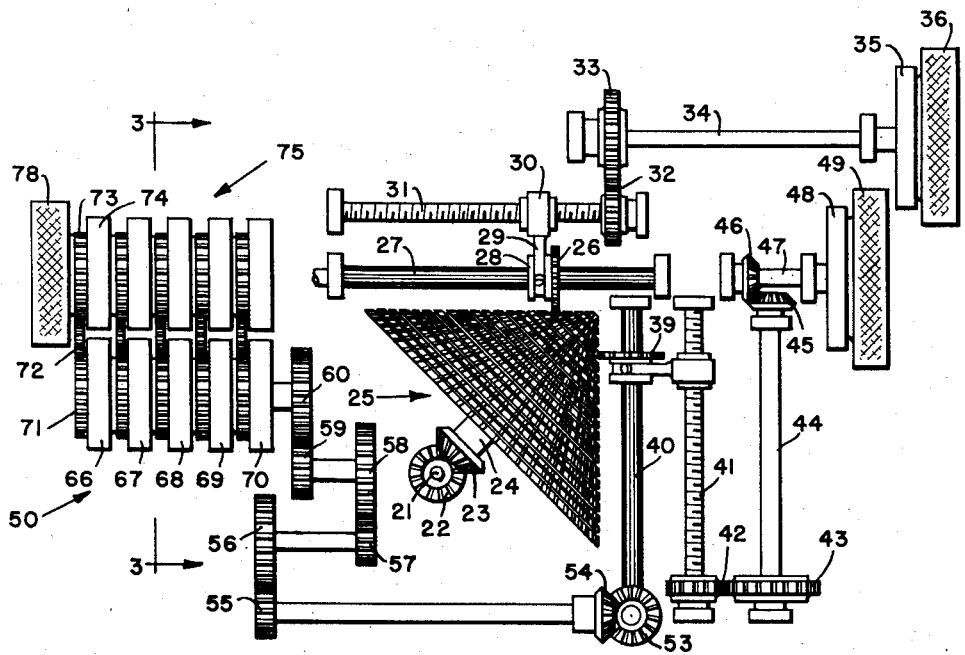
Fig. 2 is a side elevational view of the apparatus shown in Fig. 1.

Referring to Fig. 2, the shaft 21 is geared in a ratio of 2:1 through bevel gears 22 and 23 to a shaft 24 that fixedly supports a plurality of spur gears 25 having progressively smaller pitch diameters, as viewed from the point nearest bevel gear 23. This cone of gears comprises one portion of a variable-speed drive including as another portion, a pinion 26 splined to a shaft 27 that lies over the cone 25 and in a plane including an element of the cone of gears. The spur gear 26 is provided with a spool collar 28 that cooperates with a finger 29 integral with a nut 30 threaded onto a rotatable but axially immovable screw 31. The screw 31 fixedly supports a pinion 32 that meshes with a pinion 33 fixed to a shaft 34. The shaft 34 has fixed to it a dial 35 and hand wheel 36. The dial 35 is divided into twenty equal five-unit increments representing five-cent values from zero to one dollar. The gear ratio between the gear 26 and the cone of gears 25 varies from $$\frac{4}{1}$$

for the five-cent increment to $$\frac{1}{5}$$

for a dollar increment.

Referring to Fig. 1, the splined shaft 27 is directly connected to the input shaft 37 of a conventional Veeder-Root counter 38 having five dials and the usual tens transfer mechanism common to such counters.

From the foregoing it is evident that by rotating the dial 35 to a desired five-cent incremental value, the pinion 26 will be caused to mesh with the proper gear of the cone gear train 25 to cause the counter 38 to register an accumulation of the selected five-cent increment each minute of elapsed time.

Inasmuch as the overtime rate for telephone calls often exceeds one dollar per minute, provision is made in the present invention to accommodate such values. Referring again to Fig. 2, another pinion 39 is splined to a shaft 40 that lies within a plane including another element of the cone of gears 25, and it is adapted to be moved selectively into mesh with any of the gears of cone 25 by the rotation of a screw 41 in the same manner as the rotation of screw 31 shifts the pinion 26 from gear to gear. The screw 41 is provided with a gear 42 that meshes with a pinion 43 fixed to a shaft 44. A bevel gear 45 on shaft 44 meshes with a bevel pinion 46 on a shaft 47. The shaft 47 supports another dial 48 that is provided with twenty equal divisions, each representing one dollar in value. A hand wheel 49 identical with hand wheel 36 is provided for setting the dial 48. The splined shaft 40 is geared to a separate Veeder-Root counter 50 through a system of gearing including gears 51 through 60, inclusive, that provides a gear reduction of 5:1 so that each two revolutions of the cone of gears 25 provide the correct revolution of the units dial of the counter 50.

The counters 38 and 50 each have five digit dials 61 to 65 and 66 to 70, respectively. Since each digit dial and the ensuing mechanism is identical, only one will specifically be described. Referring to Fig. 2, the dial 66 is provided with a spur gear 71 integral with it that meshes with an idler gear 72 that in turn meshes with a gear 73 integral with a digit dial 74 of a Veeder-Root counter 75 substantially identical with the counter 50. The only difference between counters 50 and 75 is that the counter 50 is provided with embossed numerals on its dials for a purpose to be described later, whereas the dials of the counter 75 are designed for visual functioning. In a like manner, a fourth Veeder-Root counter 76 (Fig. 3) is provided beneath counter 38 and geared thereto through idler gears in the same manner that counters 50 and 75 are geared together. The counters 38 and 75 are provided with clearing hand wheels 77 and 78 for returning their respective counters and the ones geared thereto back to zero after each functioning of the apparatus.

Figure 3:
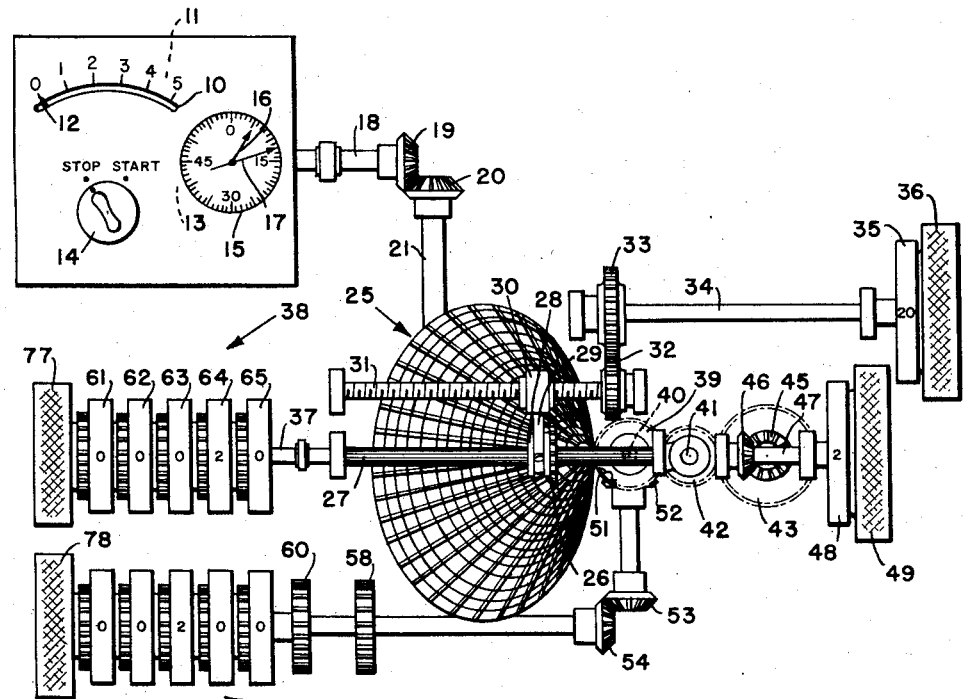
Fig. 3 is a sectional elevational view looking in the direction of the arrows and taken substantially along line 3—3 of Fig. 2.
Figure 4:
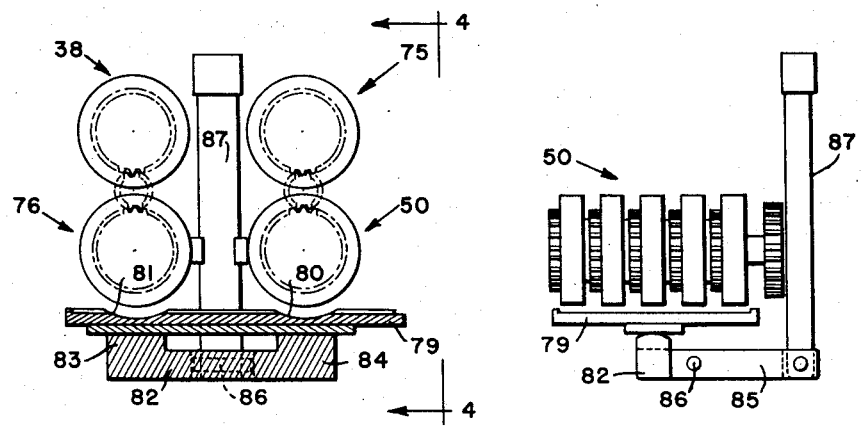
Fig. 4 is a sectional view looking in the direction of the arrows and taken substantially along line 4—4 of Fig. 3, certain parts having been omitted.

Referring to Figs. 3 and 4, a tray-like element 79 is located relatively to the counters 50 and 76 such that concave portions 80 and 81 thereof are in cooperating position with the convex portions of the dials of the counters. The tray-like element 79 is fixed to a bifurcated arm 82 having backing-up portions 83 and 84 in line with the concave portions 81 and 80, respectively. The arm 82 is fixed to a lever 85 (Fig. 4) that is fulcrumed at 86. A depressible link 87 is connected to the lever 85, and upon depression thereof causes the tray-like element 79 to be pressed against the embossed figures of the dials of the counters 50 and 76 so that when a card is located on the tray-like element 79, a permanent record for future use can be produced.

In operation, when a phone call is desired to be made, which involves a predetermined number of minutes at a base-rate charge and a different charge for each minute thereafter, the phone user ascertains from the operator what are the base rate and number of minutes. He then sets the cents dial 38 for the base rate by manually turning the proper digit dials thereof. He then sets the timer lever 12 to the proper number of minutes. The dials 36 and 49, or either of them, are set for the cost per minute of overtime, and finally, when he begins talking to the desired party, he turns the switch 14 to its "start" position. This releases the lever 12, or energizes the time-delay relay 11 (Fig. 5). After the number of minutes have elapsed, as the setting of lever 12 originally indicated, the $TR_1$ switch (Fig. 5) closes, energizing the clock motor 13, starting the operation of the transmission including the cone of gears 25. At the end of the phone call, the user merely turns the switch 14 to its "stop" position, deenergizing the relay 11 and causing the opening of switch $TR_1$, thereby stopping the clock motor 13 and the transmission connected to it. With a card in the tray-like element 79, the operator depresses the link 87, causing a permanent record of the cents dial and the dollars dial which must be totaled manually for the entire cost of the phone call.

In some instances, the telephone companies charge for each minute of overtime at a fractional point of a minute. For example, the overtime charge for each minute will not take place until a certain number of seconds of that minute have elapsed, after which the entire minute's charge is made. To take care of such a system, alternative arrangements have been devised which require only two Veeder-Root counters instead of four as are required in the disclosure of Figure 1.

Figures 6, 8:
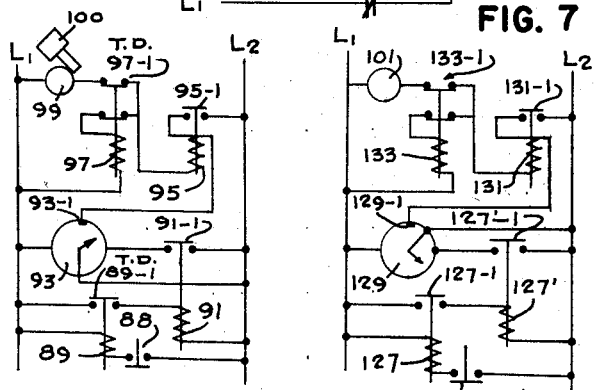
Fig. 6 is a line wiring diagram for alternative apparatus to which the principles of the invention have been applied.
Fig. 8 is a wiring diagram of the apparatus of Fig. 7.

Referring to Fig. 6, in which is disclosed one electrical embodiment of the invention, closing the "start"-"stop" switch 88 energizes a relay 89 that starts the pre-settable timing switch 89–1 (similar to the timing device 11, 12 of Figs. 5 and 1) to move toward a closed position. When the pre-set time has elapsed, switch 89–1 closes, energizing a relay 91 that closes a switch 91–1. Closing switch 91–1 energizes the synchronous clock motor 93 that is provided with an adjustable contact 93–1 that can be preset to be closed each time the second hand of the clock passes it. Closing switch 93–1 energizes a relay 95, thereby causing it to close a holding switch 95–1 to hold the circuit after the second hand passes the switch 93–1. Closing switch 93–1 also energizes an adjustable time-delay relay 97 having a normally-closed switch 97–1. Additionally, closing switch 93–1 energizes a constant-speed 2,000 r.p.m. motor 99 geared to a Veeder-Root counter 100 in a 10:1 reduction. The adjustable time-delay relay 97 can be set for opening switch 97–1 at any time within a wide range of time. In the contemplated circuit, with a motor speed of 2,000 r.p.m. for motor 99, the order of opening switch 97–1 by the relay 97 would vary from approximately 1/7 of a second to 59 seconds for any five-cent increment between zero and twenty dollars. Accordingly, each 1/7 of a second represents a five-cent increment so that 59 seconds equals twenty dollars plus. Since the motor 99 rotates 2,000 r.p.m., it is evident that each time switch 93–1 closes during each overtime minute, timer 97 remains energized for its preset condition between 1/7 of a second and 59 seconds as dictated by the overtime charge of the call in five-cent increments. A dial may be attached to the adjustable mechanism of this relay 97 that is calibrated in five-cent increments between zero and twenty dollars.

The cost of each minute of overtime is caused to be accumulated on the counter 100 as the second hand of the clock passes the preset switch 93–1 during each overtime minute. Accordingly, the charge for overtime is made only after the elapsed seconds of each minute as the setting of the switch 93–1 dictates. At the end of the call, the user merely opens the "start"-"stop" switch 88 thereby deenergizing relay 91 causing switch 91–1 to open, thereby stopping the clock motor 93.

It is to be understood, of course, that the counter 100 cooperates with another counter having embossed dials, and a permanent recording arrangement is provided, all as more fully described in connection with Figs. 1 to 4, inclusive.

Figure 7:
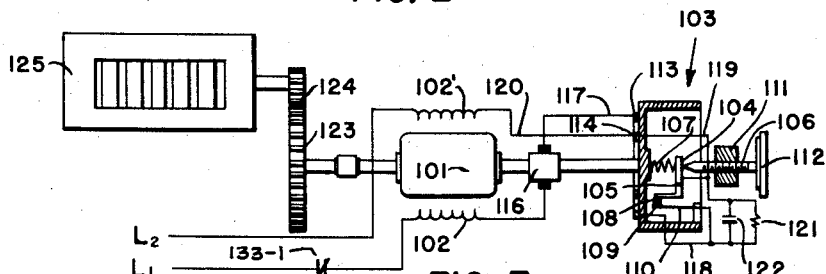
Fig. 7 is a schematic view of still another alternative structure to which the principles of the invention have been applied.

Referring to Figs. 7 and 8, the principles of the invention are shown as applied to a variable-speed electric motor 101 having field windings 102 and 102'. The motor 101 on its one side is directly connected to a centrifugal governor 103 of the type referred to on page 217 of the 4th edition of Croft's Handbook and manufactured by the Lee Engineering and Manufacturing Company. The governor 103 includes a cylindrical housing adapted to be rotated by the motor 101. Within the cylindrical housing, an L-shaped link 104 is pivotally mounted at 105. The upper end of the vertical leg of the L-shaped link 104 is urged into contact with the end of a screw 106 by a spring 107. The axis of screw 106 coincides with the center line of rotation of the motor 101, and the pivot 105 is rigidly mounted on and rotates with the housing of governor 103. The horizontal leg of link 104 is provided with a contact 108 that is adapted to cooperate with a contact 109 on a leaf spring 110 mounted on and rotatable with the housing of the governor 103. The screw 106 is threaded into a stationary nut 111 and a hand dial 112 is connected to the screw 106 and is provided with calibrations representing increments of five cents each between zero and twenty dollars. The one face of the governor 103 is provided with current-carrying slip rings 113 and 114.

A line $L_1$ is connected to a switch 133–1 of a time-delay relay 133 for a purpose to be described later, and then extends to the one field winding 102, thence to a commutator 116. From the commutator a line 117 is connected to the slip ring 113 which in turn is connected by a line 118 to the contact 109 through the leaf spring 110. The contact 108 is connected by a line 119 to the slip ring 114. A line 120 extends from the slip ring 114 to the field 102' of the motor 101, thence to line $L_2$.

With the apparatus in the condition shown in Fig. 7, the motor 101 is caused to rotate. When its speed causes centrifugal force to throw contact 109 out of engagement with contact 108, the current will be cut off from the fields 102 and 102' causing the motor 101 to slow down. When the speed of motor 101 decreases, contacts 108 and 109 re-engage, thereby causing motor 101 to speed up. In order to smooth the operation of motor 101, a conventional resistance 121 is provided across the contacts 108 and 109, and a condenser 122 prevents objectionable interference with radio reception in the vicinity of the apparatus.

The end of motor 101 that is opposite to that connected to the governor 103 is provided with a gear 123 that meshes with a pinion 124 in a predetermined gear ratio for a purpose to be described. The gear 124 is mounted on the input shaft of a conventional Veeder-Root counter 125.

Referring to Fig. 8, the user will set a timer switch 127–1 which is similar to switch 89–1 of Fig. 6. When the user begins talking, he will close the "start"-"stop" switch 126', thereby energizing a relay 127 that releases the timer switch 127–1. When timer switch 127–1 closes, it energizes a relay 127'. Energization of relay 127' closes switch 127'–1, thereby energizing synchronous clock 129 of the re-settable stop-watch type. The clock 129 is provided with a pre-settable, normally-open switch 129–1, similar to switch 93–1 of Fig. 6, that is closed each time the second hand of clock 129 passes it. Closing switch 129–1 energizes a relay 131, thereby closing a holding switch 131–1 that holds the circuit when the second hand of clock 129 passes the contact 129–1. Closing switch 129–1 also energizes a time-delay relay 133 for a purpose to be described later and also energizes the motor 101 through the normally-closed time-delay switch 133–1. The time-delay relay can be set for any predetermined duration, after which switch 133–1 opens. Combined with a variable ratio that can be established between change gears 123 and 124, it is evident that the setting of relay 133 for any value less than a minute must be accompanied with a complementary ratio of gears 123 and 124 to provide the proper operation of counter 125 for a given setting of the dial 112. If the gearing 123 and 124 has a ratio of 4:1, then the time-delay relay 133 will be set for ¼ of a minute, after which time duration, switch 133–1 will open stopping motor 101. Accordingly, with dial 112 pre-set for the correct value of overtime charge per minute, the motor 101 will rotate at a speed to record that charge within the quarter of a minute duration of the time-delay relay 133. And, each time the second hand of clock 129 passes the contact 129–1, an additional operation of motor 101 will be effected to thereby accumulate the overtime charge. It is, of course, to be understood that the counter 125 is to be employed with a complementary counter which is adapted to cooperate with a permanent record printing mechanism as described in connection with the apparatus shown in Figure 1.

Although the principles of the invention have been shown and described as applied to three embodiments of the invention, it will be evident that numerous changes may be made in such details, and certain features may be used without others, without departing from the principles of the invention.

What is claimed is:

1. Apparatus comprising in combination, a pre-settable time-delay device; a time regulated driving mechanism adapted to be started by said time-delay device; means adapted to be set at a predetermined value; a counting device; and a driving connection between said time regulated driving mechanism and said predetermining value means to cause the latter to operate the counting device in a manner to accumulate said predetermined value as a function of time.

2. Apparatus comprising in combination, a presettable time-delay device; a time regulated driving mechanism; means adapted to be set at a predetermined value; a counting device; a driving connection between said predetermining value means and said counting device; a driving connection between said time regulated driving mechanism and said predetermining value means to cause the latter to operate the counting device in a manner to accumulate said predetermined value as a function of time; and means for printing the accumulated value to provide a permanent record thereof.

3. Apparatus comprising in combination, a pre-settable time-delay device; a time regulated driving mechanism adapted to be started by said time-delay device; means adapted to be set at a predetermined value; a counting device; a driving connection between said time regulated driving mechanism and said predetermining value means to cause the latter to operate the counting device in a manner to accumulate said predetermined value as a function of time; and means for printing the accumulated value to provide a permanent record thereof.

4. Apparatus comprising in combination, a pre-settable time-delay device; a time regulated driving mechanism adapted to be started by said time-delay device; a counting device; a variable-speed transmission, drivingly connected to said time regulated driving mechanism and drivingly connected to said counting device; and means for adjusting said variable-speed drive to cause it to drive said counting device at a pre-determined rate of speed.

5. Apparatus comprising in combination, a pre-settable time-delay device; a time regulated driving mechanism adapted to be started by said time-delay device; a counting device; a variable speed transmission, drivingly connected to said time regulated driving mechanism and drivingly connect to said counting device; means for adjusting said variable-speed drive to cause it to drive said counting device at a pre-determined rate of speed; and means for printing the value accumulated on said counter after the lapse of a predetermined time interval.

6. Apparatus comprising in combination, a pre-settable time-delay device; a time regulated driving mechanism adapted to be started by said time-delay device; a counting device; a variable-speed transmission, drivingly connected to said time regulated driving mechanism and drivingly connect to said counting device, said variable-speed drive including a series of variable-pitch gears mounted on a shaft driven by said timing mechanism and a driven gear adapted to be shifted to mesh with any of said variable-pitch gears; means for connecting said driven gear to said counting device; and means for shifting said driven gear from mesh with any of said variable-pitch gears to another.

7. Apparatus comprising in combination, a time regulated driving mechanism; a pre-settable time delay device connected to said time regulated driving mechanism; separate counting devices; a variable-speed drive including a plurality of different pitch diameter gears, and driven by said time regulated driving mechanism; separate drives from said variable-speed drive to each of said counting devices, each including a shiftable gear adapted to be shifted from meshing relation with any of said different pitch diameter gears to another; and different gear ratios between each shiftable gear and its corresponding counting device.

8. Apparatus comprising in combination, a time delay device; a time regulated driving mechanism adapted to be started by said time delay device; an adjustable contact adapted to be made once each minute of operation of said time regulated driving mechanism; an electric motor adapted to be energized when said adjustable contact is made; a counting device connected to said electric motor; and a time-delay relay within said motor circuit for de-energizing said motor at the end of a predetermined time interval.

9. Apparatus comprising in combination, a time-delay device; a time regulated driving mechanism adapted to be started by said time-delay device; an adjustable contact connected to said time regulated driving mechanism and adapted to be made once each minute of operation of said time regulated driving mechanism; an electric motor adapted to the energized when said adjustable contact is made; a counting device connected to said electric motor; a time-delay relay within said motor circuit for de-energizing said motor at the end of a predetermined time interval; and means for printing the value accumulated by said counting device after the lapse of a predetermined time interval.

10. Apparatus comprising in combination, a time delay device; a time regulated driving mechanism adapted to be started by said time delay device; an adjustable contact adapted to be made once each minute of operation of said time regulated driving mechanism; a constant-speed electric motor adapted to be energized when said adjustable contact is made; a counting device connected to said constant-speed motor; and an adjustable time-delay relay within said motor circuit for de-energizing said motor at the end of a predetermined time interval.

11. Apparatus comprising in combination, a time-delay device; a time regulated driving mechanism adapted to be started by said time-delay device; an adjustable contact adapted to be made once each minute of operation of said time regulated driving mechanism; a constant-speed electric motor adapted to be energized when said adjustable contact is made; a counting device connected to said constant-speed motor; an adjustable time-delay relay within said motor circuit for de-energizing said motor at the end of a predetermined time interval; and means for printing the value accumulated by said counting device after the lapse of a predetermined time interval.

12. Apparatus comprising in combination, a time-delay device; a time regulated driving mechanism adapted to be started by said time-delay device; an adjustable contact adapted to be made once each minute of operation of said time regulated driving mechanism; an electric motor adapted to be energized each time said adjustable contact is made; a counting device connected to said electric motor; a centrifugal switching mechanism connected into the field circuit of said motor; means for varying the effectiveness of said centrifugal switching mechanism; and a time-delay relay within said motor circuit adapted to open a normally closed switch within said motor circuit after a predetermined time interval has elapsed after the energization of said motor.

13. Apparatus comprising in combination, a time-delay device; a time regulated driving mechanism adapted to be started by said time-delay device; an adjustable contact adapted to be made once each minute of operation of said time regulated driving mechanism; an electric motor adapted to be energized each time said adjustable contact is made; a counting device connected to said electric motor; a centrifugal switching mechanism connected into the field circuit of said motor; means for varying the effectiveness of said centrifugal switching mechanism; a time-delay relay within said motor circuit adapted to open a normally-closed switch within said motor circuit after a predetermined time interval has elapsed after the energization of said motor; and means for printing the value accumulated on said counter after the lapse of a predetermined time interval.

References Cited in the file of this patent

UNITED STATES PATENTS

| | | |
|---|---|---|
| 888,781 | Bowlus | May 26, 1908 |
| 1,064,998 | Sandell | June 17, 1913 |
| 1,084,661 | Poole | Jan. 20, 1914 |
| 1,084,671 | Tallmadge | Jan. 20, 1914 |
| 1,661,249 | Deakin | Mar. 6, 1928 |
| 1,682,126 | Hoffman | Aug. 28, 1928 |
| 2,024,115 | Schwartz | Dec. 10, 1935 |
| 2,334,143 | Basquin et al. | Nov. 9, 1943 |
| 2,691,485 | Kennedy | Oct. 12, 1954 |
| 2,743,867 | Gervais | May 1, 1956 |